(12) United States Patent
Pattison et al.

(10) Patent No.: US 12,262,085 B2
(45) Date of Patent: Mar. 25, 2025

(54) MEDIA DEVICE SOFTWARE INSTALLATION

(71) Applicant: DISH Network L.L.C., Englewood, CO (US)

(72) Inventors: Alan Terry Pattison, Castle Rock, CO (US); Geoffrey Kemp, Aurora, CO (US); Ashok Soni, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 250 days.

(21) Appl. No.: 16/742,714

(22) Filed: Jan. 14, 2020

(65) Prior Publication Data

US 2021/0219017 A1 Jul. 15, 2021

(51) Int. Cl.
| | |
|---|---|
| *H04N 21/41* | (2011.01) |
| *G06F 8/65* | (2018.01) |
| *H04N 21/418* | (2011.01) |
| *H04N 21/436* | (2011.01) |
| *H04N 21/443* | (2011.01) |
| *H04N 21/45* | (2011.01) |
| *H04N 21/61* | (2011.01) |
| *H04N 21/81* | (2011.01) |

(52) U.S. Cl.
CPC ........... *H04N 21/4516* (2013.01); *G06F 8/65* (2013.01); *H04N 21/4126* (2013.01); *H04N 21/6143* (2013.01)

(58) Field of Classification Search
CPC ................................................ H04N 21/4516
See application file for complete search history.

(56) References Cited

U.S. PATENT DOCUMENTS

| | | | | |
|---|---|---|---|---|
| 2007/0174635 A1* | 7/2007 | Jones | ..................... | G06F 21/125 |
| | | | | 713/189 |
| 2011/0022641 A1* | 1/2011 | Werth | ..................... | H04L 67/34 |
| | | | | 707/803 |
| 2011/0107378 A1* | 5/2011 | Kooman | .......... | H04N 21/47211 |
| | | | | 725/87 |
| 2013/0185761 A1* | 7/2013 | Friel | ..................... | H04N 17/00 |
| | | | | 725/139 |
| 2020/0092515 A1* | 3/2020 | Stern | ....................... | H04N 5/60 |

* cited by examiner

*Primary Examiner* — Hsiungfei Peng
*Assistant Examiner* — Fred Peng
(74) *Attorney, Agent, or Firm* — Jeremiah J. Baunach; Frontier IP Law PLLC

(57) ABSTRACT

A facility for updating software installed on a media device in connection with installation of the media device in customer premises is described. Outside the customer premises, the facility transfers a later-issued version of the software installed on the media device from a server to a portable storage device. Within the customer premises, the facility transfers the later-issued version of the software installed on the media device from the portable storage device to the media device for installation on the media device.

18 Claims, 6 Drawing Sheets

MEDIA DEVICE SOFTWARE INSTALLATION

BACKGROUND

A main television receiver (such as a set-top box provided by a cable or satellite television service provider) is connected to the cable or satellite television service provider and serves as the interface between the backend cable or satellite television service provider system and the home entertainment system on the customer premises. One or more other receiving devices ("player devices" or "presentation devices"), connected to this television receiver, can each be connected to respective TVs throughout the customer premises. For example, the player devices may be connected to the television receiving device via a home local area network (LAN) that is wired, wireless, or hybrid, and communicate over the LAN with the television receiving device using the transmission control protocol/Internet protocol (TCP/IP) suite of networking communication protocols. These player devices are able to play on their respective TV the live broadcast, recorded, streaming and on-demand programming initially received by the television receiving device from the cable or satellite television service provider or other content provider.

It is common for a technician to install the television receiver and player devices at the premises of a customer, such as in response to the customer signing up for a cable or satellite television service. For example, the technician performing such an installation may pick up the needed television receiver and player devices from a warehouse where they are stocked, and carry them to the customer's home or other premises. In some cases, the technician further installs—and sometimes also delivers—other related equipment, such as coaxial cables or splitters, satellite dishes and controllers, antennas of other types, etc.

Typically, the television receiver and player devices use software in their operation. In various approaches, the software can, for example, include software for accessing and managing program guides providing information about available programs; accessing programs, such as to present them on a TV or record them for later presentation; providing program recommendations; exchanging messages about programs; obtaining billing information; user interfaces for invoking or controlling such functionalities; and operating system, device drivers, codecs, and/or other lower-level software resources for supporting such functionalities.

It is common for some or all of the software needed by television receivers and player devices to be installed on them prior to their installation at customer premises, such as during their manufacture and packaging. In some cases, after television receivers and player devices are installed at customer premises, they periodically download and install updated versions of software, such as late at night. Such periodic downloading may occur via the connection used to receive television programming, or via a separate connection. This periodic downloading eventually facilitates the receipt and installation of later versions of device software. When these new versions are received and installed, they may, for example, correct bugs in earlier versions, provide new functionalities relative to earlier versions, support additional hardware devices or components, etc.

DETAILED DESCRIPTION

Figure 1:
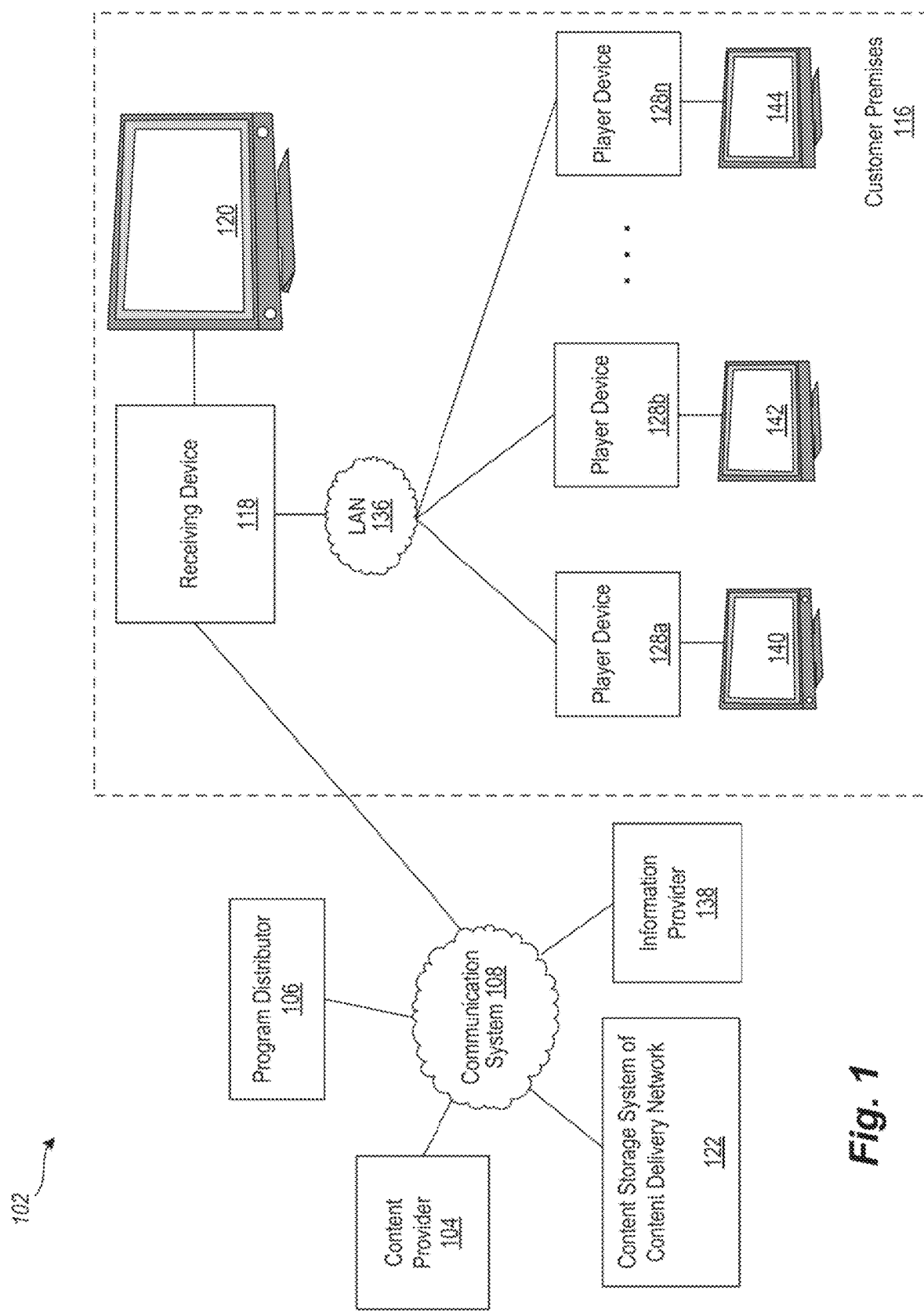
FIG. 1 is an overview block diagram illustrating an example installed television service customer premises environment in which the facility installs software or media devices in some embodiments.

The inventors have identified disadvantages with conventional approaches to installing software on television receiver and player devices. In particular, the inventors have recognized that conventional approaches fail to make the most current versions of software available at the time of device installation, both for use by the customer and for service demonstrations by the installing technician. As a result, a customer's first experience with the cable or satellite television service may be diminished by a software bug in the installed version of software that is resolved in the current version of software. Also, a technician can be prevented from demonstrating a new and advantageous feature that is only present in the current version of software.

In response to this recognition, the inventors have conceived and reduced to practice a software and/or hardware facility for installing a current version of software on television receiver and player devices as part of their installation ("the facility").

In some embodiments, the facility automatically stores the current version of software for one or more cable or satellite television service devices on portable storage devices—such as smart phones or USB memory sticks—that are carried by technicians with them to perform service installations on customer premises. Once each cable or satellite television service device ("service device") is powered on at the customer premises, the technician connects a portable storage device to the service device for installation of the appropriate software on the service device. This connection can be, for example, via a wireless connection such as Bluetooth, or by plugging the portable storage device into a physical interface of the service device.

In some embodiments, the facility initiates the software installation process near the beginning of the service installation appointment at the customer premises, permitting the software installation to proceed while the technician performs other portions of the service installation appointment, such as the installation of a satellite dish or coaxial cable connection, for example.

In some embodiments, the facility uses encryption and/or additional security protocols to prevent or increase the likelihood of installation of counterfeit code, and installation of code that has been altered since publisher certification.

By performing in some or all of the ways discussed above, the facility completes the installation of the latest version of service device software during the service installation appointment, permitting the customer as well as the technician to use the service devices with the latest version of software during the appointment and thereafter.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. As one example, by installing service device software from a portable storage device, the facility conserves data transmission network resources that would otherwise be needed to transmit service device software from a remote server.

FIG. 1 is an overview block diagram illustrating an example installed television service customer premises environment in which the facility installs software or media devices in some embodiments. In the customer premises environment 102, audio, video, and/or data service providers, such as television service providers, provide their customers a multitude of video and/or data programming (herein, collectively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

The receiving device 118 interconnects to one or more communications media or sources. For example, the various media content may be delivered as data using the IP suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

In various embodiments, examples of a receiving device 118 include, but are not limited to, one or a combination of the following: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive programming via a connection to a satellite or cable television service provider outside the customer premises and communicate that programming to another device over a network. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of secure communications between media devices, which will be described in further detail below.

In various embodiments, examples of a presentation device 120 include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

As shown in FIG. 1, a plurality of player devices 128a, 128b, 128n are communicatively connected to the television receiving device via a home LAN 136 that generally covers only part or all of the customer premises 116. There may be fewer or additional player devices in various embodiments. In some embodiments, each of the player devices 128a, 128b, 128n communicates over the LAN 136 with the television receiving device using the transmission control protocol/Internet protocol (TCP/IP) suite of networking communication protocols. In various embodiments, all or part of the LAN 136 may be wired or wireless. These player devices are able to receive from the receiving device 118, over LAN 136, and play on their respective connected presentation devices 140, 142, 144, the live broadcast, recorded, streaming and/or on-demand programming initially received by the receiving device 118 from the cable or satellite television service provider. In the present example, the cable or satellite television service provider may encompass or be in communication with some or all of the content provider 104, program distributor 106, content storage system of content delivery network 122, and/or information provider 138.

In particular, a content provider 104 provides program content, such as television content, to a distributor, such as the program distributor 106. Example content providers include television stations which provide local or national television programming and special content providers which provide premium based programming, pay-per-view programming, and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In some embodiments, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108, such as from the content storage system of a content delivery network 122.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at the content storage system of the content delivery network 122, under direct or indirect control of the program distributor 106, to the receiving device 118. The content storage system of the content delivery network 122 may also comprise multiple separate storage facilities and streaming media content servers geographically separated from each other (also referred to as an "edge cache"), each of which streams stored media content to particular customer locations based on a number of factors such as proximity of the customer premises 116 to the individual content storage system of the content delivery network 122 location or edge cache, load balancing parameters, current demand on the individual content storage system of the content delivery network 122, capacity of the individual content storage system of the content delivery network 122, etc.

Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device, or other computing device or media player, and the like, allowing viewing in real time at the customer premises 116, or download it to a receiving device 118 such as a computer, DVR (also called a personal video recorder) or portable media player for viewing at any time. The receiving device 118 may in turn provide each of the player devices 128a, 128b, 128n access to such content from the receiving device 118 over the home LAN 136, such that each player device 128a, 128b, 128n may play the content on their respective connected presentation devices 140, 142, 144, at various locations throughout the customer premises 116. In some embodiments, the presentation device may be integrated as part of the player device. Also, in some embodiments, a player device may communicate with the receiving device 118 to receive such content remotely via the Internet or otherwise via communication system 108. The program distributor 106 may offer VOD streaming, including pay-per-view and free content, whereby a user buys or selects a movie or television program and it begins to play on the presentation device 120 or on other presentation devices 140, 142, 144 via their respective player devices 128a, 128b, 128n almost instantaneously; downloading of the media content to a DVR rented from the program distributor; and/or downloading the content onto a computer or mobile device, for viewing in the future.

In some embodiments, the receiving device 118 may be a set-top box provided by the cable provider, satellite provider, or other program distributor 106 to which the customer may subscribe to receive such on-demand services and that also receives programming through traditional channels using a terrestrial, satellite signal, and/or cable television format. The various player devices 128a, 128b, 128n on the customer premises in communication with the receiving device 118 may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device, or other computing device or media player not provided by or controlled by the cable provider, satellite provider, or other program distributor to which the customer subscribes for the on-demand services.

In some embodiments, each player device 128a, 128b, 128n establishes an Internet Layer end-to-end security connection between the receiving device 118 and each player device 128a, 128b, 128n as part of the initial pairing process between each player device 128a, 128b, 128n and the receiving device 118 to generate a VPN over LAN 136 between each player device 128a, 128b, 128n and the receiving device 118 results in increased security by having all IP traffic between the receiving device 118 and each player device 128a, 128b, 128n be encrypted.

In addition, information provider 138 may provide various forms of content and/or services to various devices residing in the customer premises 116. For example, Information provider 138 may also provide information to the receiving device 118 regarding insertion of advertisements or other additional content or metadata into a media content segment provided to the receiving device 118. In some embodiments, such advertisements or other additional content or metadata may be provided by an advertisement server to the content provider 104, directly to the receiving device 118, or be inserted into the streaming media stored on the content storage system of the content delivery network 122 or inserted as it is being streamed to the receiving device 118. The information provider 138 may also, or instead, be another third party entity providing security data and/or services related to authentication, encryption, digital media rights, etc., on behalf of the program distributor 106 or other authorized entity.

Encryption and decryption described herein may be performed as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the environment 102, the customer premises 116, and the various devices therein, is intended as a broad, non-limiting overview of an example environment in which various embodiments of secure communications between media devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Figure 2:
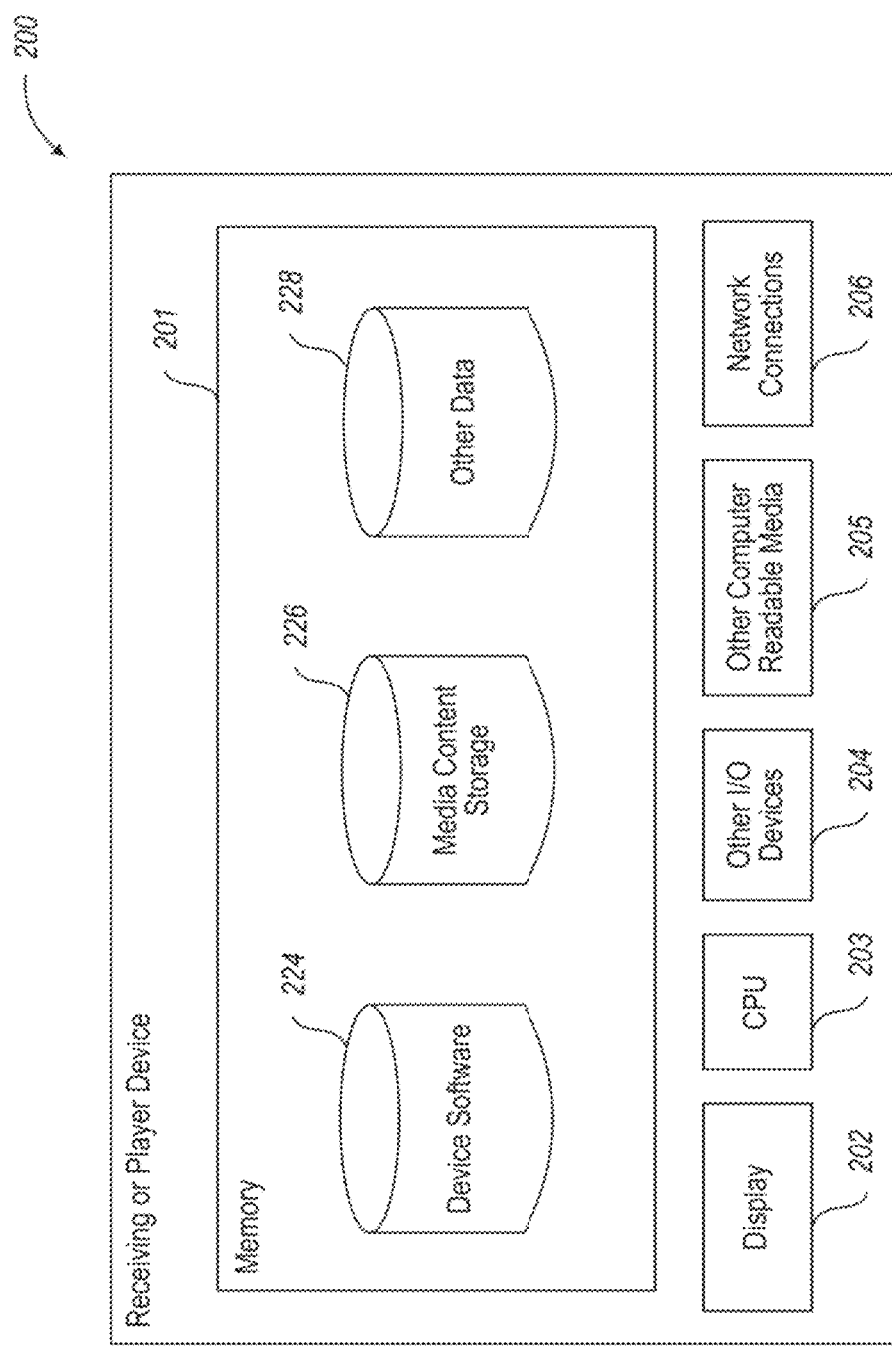
FIG. 2 is a block diagram illustrating elements of an example receiving or player device used in the environment in some embodiments.

FIG. 2 is a block diagram illustrating elements of an example receiving or player device used in the environment in some embodiments. In some embodiments, the receiving or player device 200 is a device such as a set-top box, television, DVR, DVD player, PC, tablet device, game machine, smart phone, mobile device, or other computing device or media player configured to receive programming via a connection to a satellite or cable television service provider outside the customer premises and to display such programming on a presentation device. For example, receiving or player device 200 may be configured to receive, process and display on a presentation device streaming media content received directly from the satellite or cable television service provider and/or other programming received directly from the satellite or cable television service provider such as cable or satellite television broadcasts via various other physical and logical channels of communication.

Note that one or more general purpose or special purpose computing systems/devices may be used to operate the receiving or player device 200; store information regarding the receiving or player device 200, store metadata, perform DRM and key management operations, decrypt and encrypt received content; pair with various player devices on a home LAN and/or over the Internet; establish an Internet Layer end-to-end security connection, such as a secure IP tunnel, over the home LAN and/or Internet between the receiving or player device 200 and various player devices; communicate data, including programming, between the receiving or player device 200 and various player devices via the Internet Layer end-to-end security connection over the home LAN and/or Internet; and communicate with the content provider 104, program distributor 106, information provider 138 and/or content storage system of the content delivery network 122. In addition, in some embodiments, the receiving or player device 200 may comprise one or more distinct computing systems/devices and may span distributed locations. Furthermore, each block shown may represent one or more such blocks as appropriate to a specific embodiment or may be combined with other blocks.

In some embodiments, receiving or player device 200 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205 contains device software 224, media content storage 226, and other data 228, and network connections 206. Of note, one or more of the components in FIG. 2 may or may not be present in any specific implementation. For example, some embodiments may not provide other computer readable media 205 or a display 202.

Device software 224 executes on one or more CPUs 203 or processors of other types, and facilitates the receiving, decrypting, decoding, processing, selecting, recording, playback and displaying of programming, as well as the establishing of an Internet Layer end-to-end security connection, such as a secure IP tunnel, over the home LAN and/or Internet between the receiving or player device 200 and various player devices and communication of data, including programming, between the receiving or player device 200 and various player devices via the Internet Layer end-to-end security connection over the home LAN and/or Internet, as described herein. The device software 224 may also facilitate on-demand media services (e.g., VOD services), on-demand program ordering, processing and DRM and key management and storage corresponding to processing received streaming media content and other programming. The device software 224 may operate as, be part of, or work in conjunction and/or cooperation with various on-demand service software applications stored in memory 201 and on various player devices. The device software 224 also facilitates communication with peripheral devices such as a remote control, via the I/O devices 204, and with the player devices 128a, 128b, 128n and remote systems (e.g., the content provider 104, the content storage system of the content delivery network 122, the program distributor 106, and/or the information provider 138) via the network connections 206.

In some embodiments, the device software 224 includes, for example, audio/video processing modules, a program guide manager module, a Web server, and the like. Recorded or buffered programming received as streaming media content or other types of programming may reside on the media content storage 226, either in decrypted or encrypted form as applicable for securely storing, processing and displaying of the received media content according to the applicable DRM associated with the particular programming. The media content storage 226 may also store various program metadata associated with the recorded or buffered programming stored in the media content storage 226, such as that including, but not limited to, DRM data, tags, codes, identifiers, format indicators, timestamps, user identifications, authorization codes, digital signatures, etc. Other data 228 can include user profiles, preferences and configuration data, etc.

In some embodiments, the receiving device establishes an Internet Layer end-to-end security connection (an Internet protocol (IP) encrypted tunnel) between the receiving device 118 and each player device as part of the initial pairing process between each player device 128a, 128b, 128n (shown in FIG. 1) and the receiving device 118. The device software 224 is configured to manage and perform this process. Equivalent modules also exist, as applicable, in each player device 128a, 128b, 128n shown in FIG. 1. Since all traffic between the receiving device 118 and an individual player device is communicated via IP on the LAN 136 (and/or Internet in some embodiments), all traffic between the two devices would be securely encrypted at the Internet Layer, thus reducing potential security issues. This results in a secure virtual private network (VPN) between each player device and the receiving device 118.

In some embodiments, the device software 224 is configured to process the decrypted streaming media content and render the data for display on a particular presentation device and/or transmission to a player device according to specifications and requirements of the presentation device and/or player device. The device software 224, in some embodiments working in conjunction with a media content decryption and encryption engine and/or a device pairing and data transmission module may encode, decode, encrypt, decrypt, compress, decompress, format, translate, perform digital signal processing, adjust data rate and/or complexity or perform other processing on the data representing received programming and other media content as applicable for presenting the received content in real time on the presentation device as it is being received by the receiving or player device 200 and/or for transmission to a player device over the IP encrypted tunnel.

In some embodiments, the device software 224 includes an application program interface ("API") that provides programmatic access to one or more functions of the receiving device 118. For example, such an API may provide a programmatic interface to one or more functions that may be invoked by any other program, a remote control (not shown), the program distributor 106, the content provider 104, information provider 138, content storage system of the content delivery network 122 or some other module. In this manner, the API may facilitate the development of third-party software, such as various different on-demand service applications, user interfaces, plug-ins, adapters (e.g., for integrating functions of the device software 224 into desktop applications), and the like to facilitate secure communications between media devices.

In an example embodiment, components/modules of the device software 224 are implemented using standard programming techniques. For example, such components/modules may be implemented as a "native" executable running on the CPU 203, along with one or more static or dynamic libraries. In other embodiments, the device software 224 may be implemented as instructions processed by a virtual machine that executes as another program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving or player device 200 to perform various functions. In some embodiments, instructions cause the CPU 203 or some other processor, such as an I/O controller/processor, to receive decryption keys, access codes, identifications codes, etc., from external devices, such as wirelessly from a player device, other external device, or other external secure system in order to pair with the player device and establish an Internet Layer end-to-end security connection between the receiving or player device 200 and the player device for securely transmitting data.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve desired functions.

In addition, programming interfaces to the data stored as part of the receiving device 118 can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 226 and other data 228 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve desired functions.

Furthermore, in some embodiments, some or all of the components of the receiving or player device 200 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
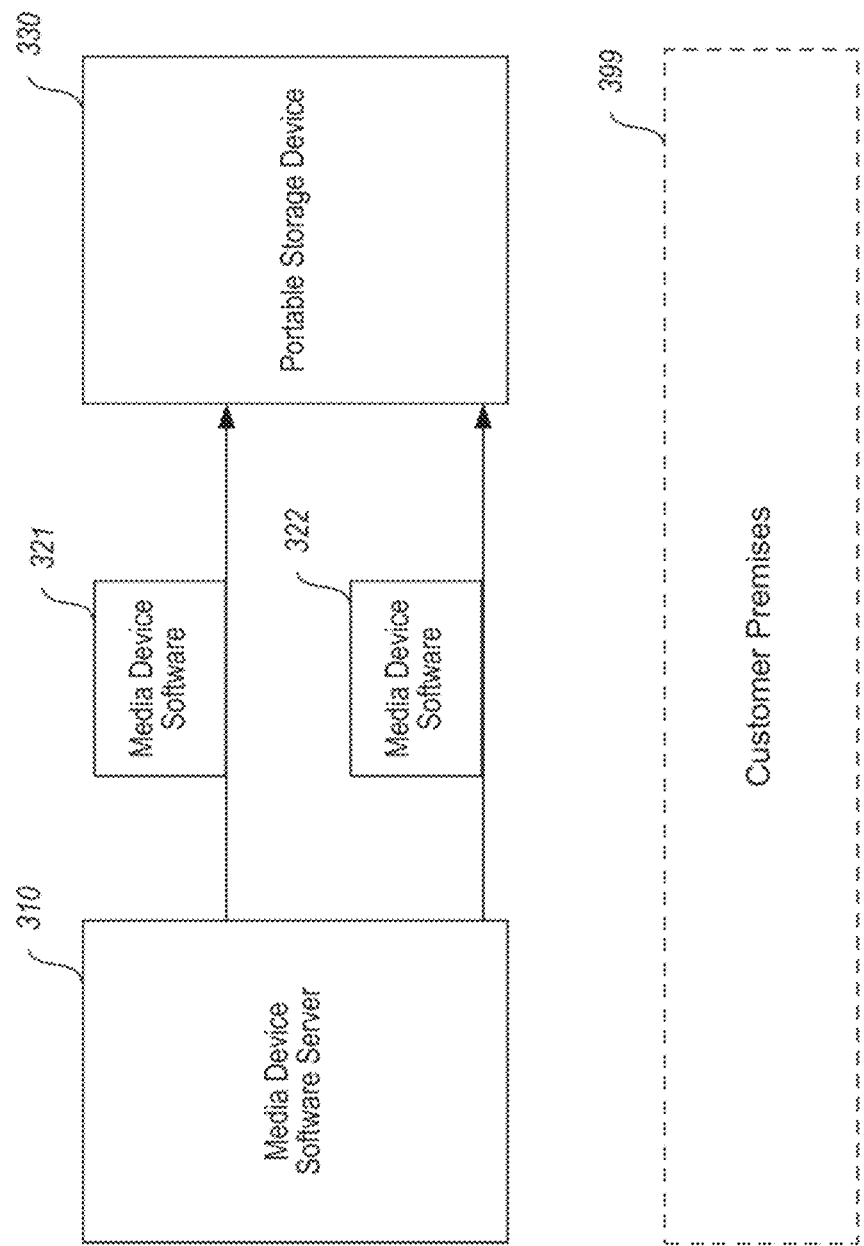
FIG. 3 is a data flow diagram showing the loading of media device software onto a portable storage device outside of customer premises performed by the facility in some embodiments.

FIG. 3 is a data flow diagram showing the loading of media device software onto a portable storage device outside of customer premises performed by the facility in some embodiments. The facility copies from a media device software server 310, for each of one or more media device types, a latest version of media device software to a portable storage device 330. For example, media device software 321 may be media device software for television receivers, while media device software 322 may be media device software for players. In various embodiments, the portable storage device is of a variety of types, including a dedicated portable storage device, such as a USB flash key or USB flash drive; a more extensive portable electronic device, such as a smartphone, tablet computer, or laptop computer; a smartcard; or a portable storage device in any other form. In some embodiments, the facility copies the media device software from the media device software server to the portable storage device using a variety of approaches, including, for instance, plugging the portable storage device into a physical connector on the media device software server, or into a cable itself plugged into the media device software server; transmitting the media device software wirelessly, such as via a Bluetooth or Wi-Fi connection; or by any other available data transfer approach.

Figure 4:
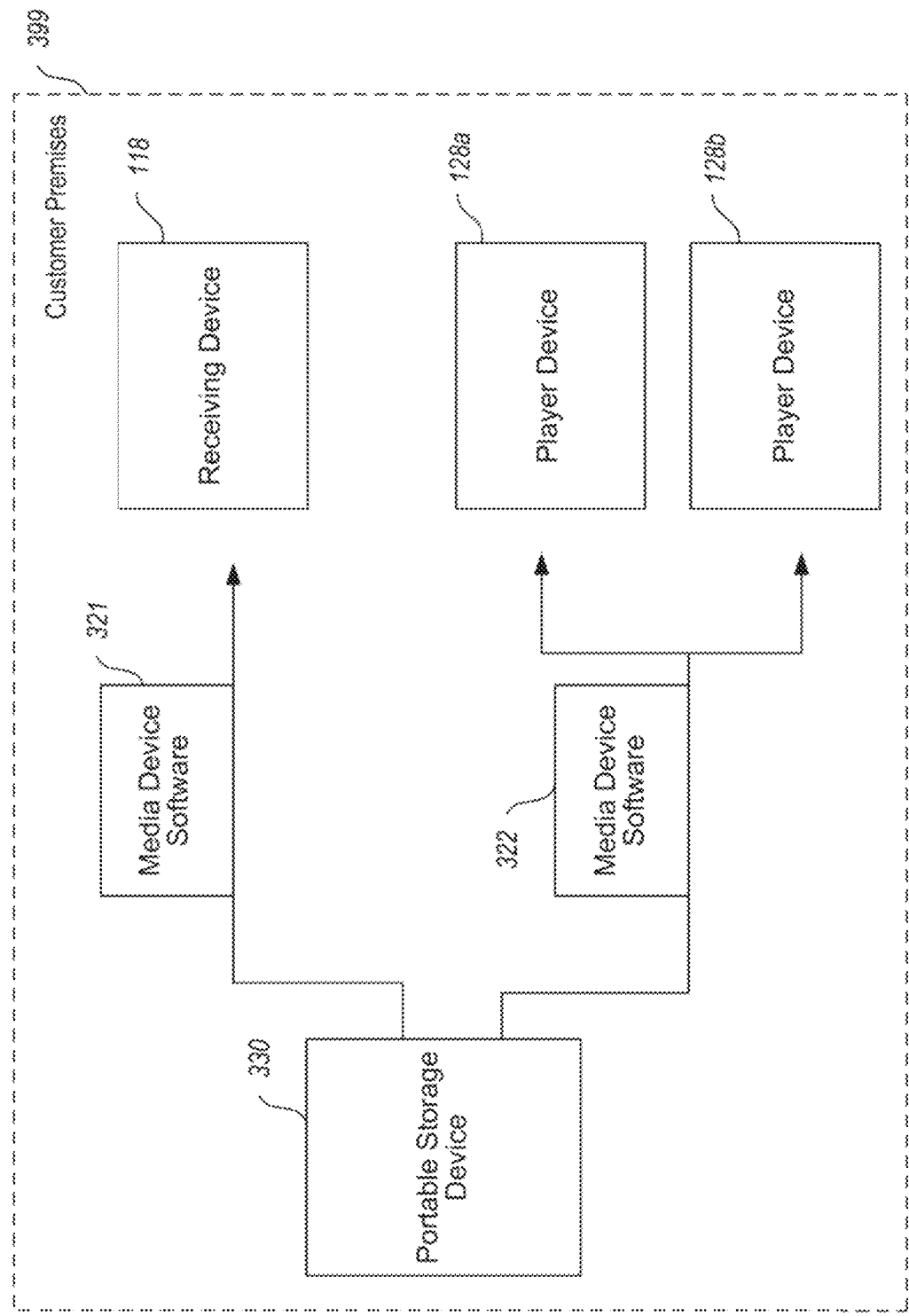
FIG. 4 is a data flow diagram showing the use of the portable storage device to install media device software at the customer premises.

FIG. 4 is a data flow diagram showing the use of the portable storage device to install media device software at the customer premises. In the customer premises 399, the facility copies media device software—such as media device 321 and 322—to media devices present on the customer premises, such as media devices 118, 128a, and 128b. In various embodiments, various data transfer approaches are used for this copying, such as those discussed above in connection with FIG. 3. In some embodiments, after installing the media device software on the media devices at the customer premises, the facility instructs each media device to install the copied software and begin its execution.

Figure 5:
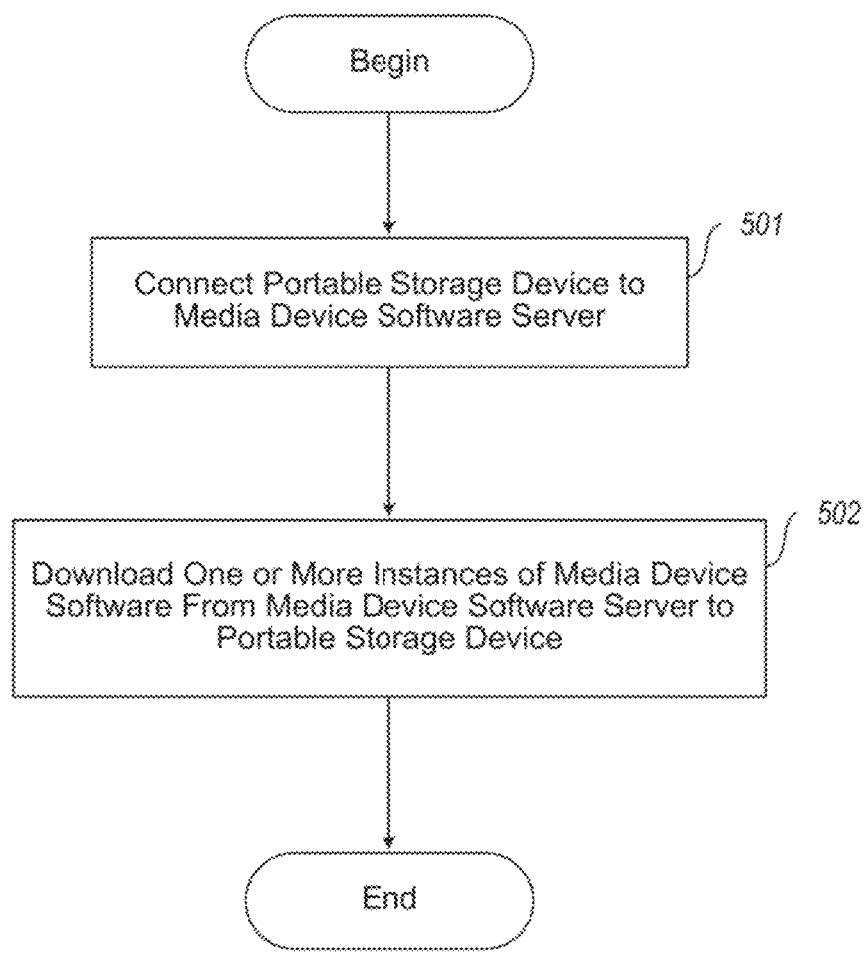
FIG. 5 is a flow diagram showing a process performed by the facility in some embodiments to copy media device software to the portable storage device outside the customer premises.

FIG. 5 is a flow diagram showing a process performed by the facility in some embodiments to copy media device software to the portable storage device outside the customer premises. In act 501, the facility connects the portable storage device to the media device software server in any of the ways discussed above in connection with FIG. 3. In act 502, the facility downloads one or more instances of media device software from the media device software server to the portable storage device, such as instances each corresponding to a different media device type. After act 502, this process concludes.

Those skilled in the art will appreciate that the acts shown in FIG. 5 and in each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

Figure 6:
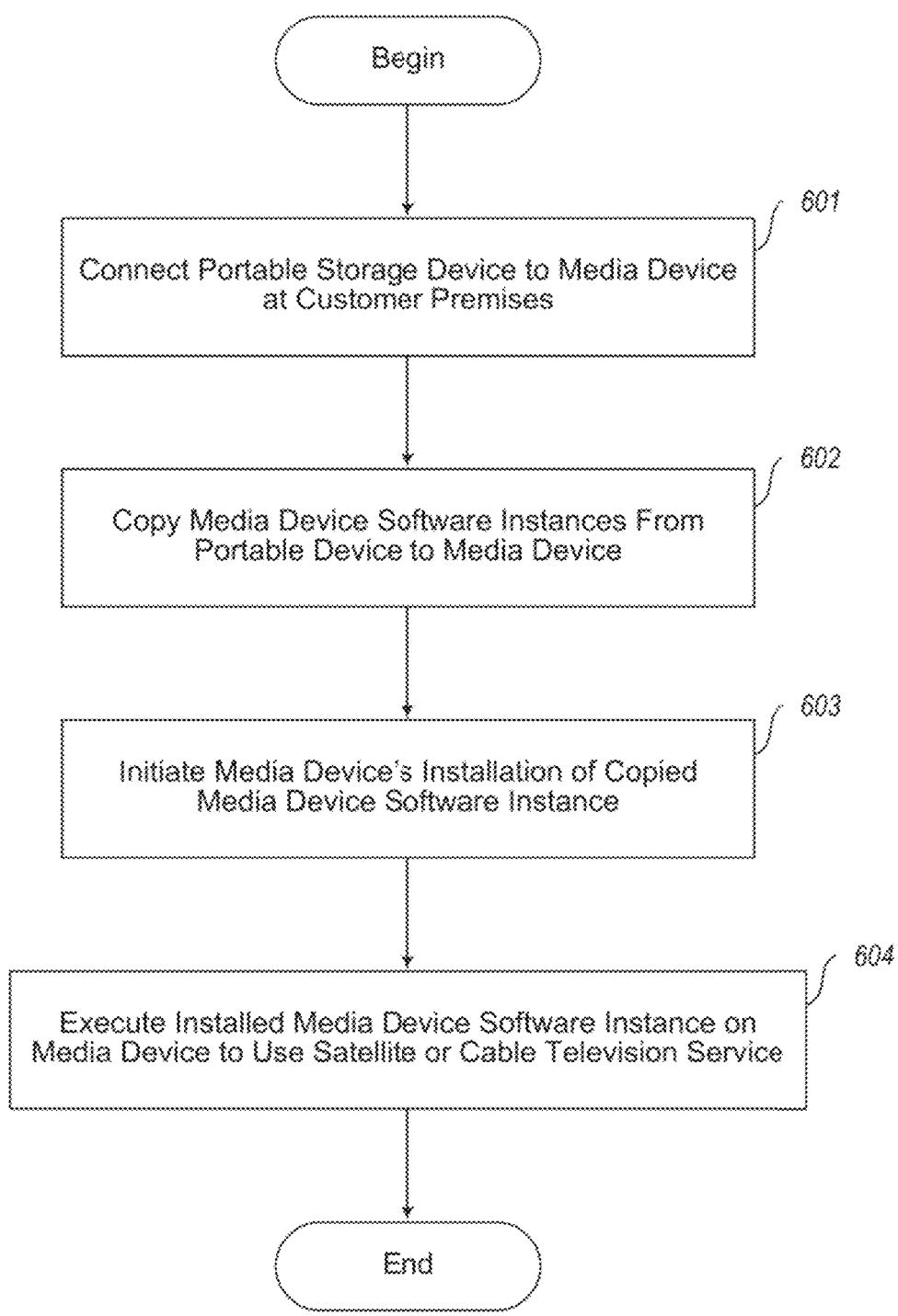
FIG. 6 is a flow diagram showing a process performed by the facility in some embodiments to install media device software on media devices at customer premises.

FIG. 6 is a flow diagram showing a process performed by the facility in some embodiments to install media device software on media devices at customer premises. In some embodiments, the facility performs this process for each media device installed at the customer premises.

In act 601, the facility connects the portable storage device to a media device at the customer premises, in any of the ways discussed above. In act 602, the facility copies one or more device software instance from the portable device to the media device. In act 603, the facility initiates the media device's installation of the media device software instance copied in act 602. In act 604, the facility causes the media device to execute the installed media device software in order to use the satellite or cable television service with the latest version of the media device software, which has been installed. After act 604, this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system for updating software installed on a satellite television receiver in connection with installation of the satellite television receiver in customer premises, the method comprising:
    outside the customer premises, transferring a later-issued version of the software installed on the satellite television receiver from a server to a portable storage device without going through another satellite television receiver; and
    within the customer premises, transferring the later-issued version of the software installed on the satellite television receiver from the portable storage device to the satellite television receiver for installation on the satellite television receiver.

2. The method of claim 1, further comprising installing the transferred later-issued version of the software on the satellite television receiver.

3. The method of claim 1 wherein the later-issued version of the software installed on the satellite television receiver is transferred from the server to the portable storage device and from the portable storage device to the satellite television receiver via wireless connections.

4. The method of claim 1 wherein the later-issued version of the software installed on the satellite television receiver is transferred from the server to the portable storage device via a physical connection between the server and the portable storage device,
    and is transferred from the portable storage device to the satellite television receiver via a physical connection between the portable storage device and the satellite television receiver.

5. The method of claim 1, further comprising, before transferring the later-issued version of the software installed on the satellite television receiver from the portable storage device to the satellite television receiver for installation on the satellite television receiver, verifying the provenance of the portable storage device.

6. The method of claim 1, further comprising, before transferring the later-issued version of the software installed on the satellite television receiver from the portable storage device to the satellite television receiver for installation on the satellite television receiver, verifying the provenance of the later-issued version of the software installed on the satellite television receiver.

7. One or more instances of non-transitory computer-readable storage media collectively having contents configured to cause a computing system to perform a method, the method for updating software installed on a media device in connection with installation of the media device in customer premises, the method comprising:
    outside the customer premises, transferring a later-issued version of the software installed on the media device from a server to a portable storage device without going through another media device; and within the customer premises, transferring the later-issued version of the software installed on the media device from the portable storage device to the media device for installation on the media device.

8. The non-transitory computer-readable storage media of claim 7, the method further comprising installing the transferred later-issued version of the software on the media device.

9. The non-transitory computer-readable media of claim 8, the method further comprising, before installing the transferred later-issued version of the software on the media device e, verifying the provenance of the portable storage device.

10. The non-transitory computer-readable storage media of claim 8, the method further comprising, before installing the transferred later-issued version of the software on the media device, verifying the provenance of the later-issued version of the software installed on the media device.

11. The non-transitory computer-readable storage media of claim 7 wherein the later-issued version of the software installed on the media device is transferred from the server to the portable storage device and from the portable storage device to the media device via wireless connections.

12. The non-transitory computer-readable storage media of claim 7 wherein the later-issued version of the software installed on the media device is transferred from the server to the portable storage device via a physical connection between the server and the portable storage device, and is transferred from the portable storage device to the media device via a physical connection between the portable storage device and the media device.

13. A portable software installation device, comprising:
an interface that transfers a latest version of software installed on a satellite television receiver from a server to a storage device;
the storage device, wherein the storage device stores the latest version of software installed on the satellite television receiver and a latest version of software installed on media devices of a distinguished type;
an interface that copies the latest version of software installed on the satellite television receiver and the latest version of software installed on media devices of a distinguished type from the storage device to the satellite television receiver and to a media device of the distinguished type delivered to customer premises; and
an enclosure into which are integrated the storage device and the interface, the enclosure suitable for carrying into the customer premises.

14. The software installation device of claim 13, further comprising a connector for physically connecting the interface to the media device of the distinguished type.

15. The software installation device of claim 13, the interface comprising a radio transmitter configured to engage a radio receiver of the media device.

16. The software installation device of claim 15, further comprising a protocol controller configured to control a data exchange session between the radio transmitter of the installation device and the radio receiver of the media device.

17. The software installation device of claim 13 wherein the storage device is configured to further store a latest version of software installed on media devices of a second type distinct from the distinguished type.

18. The software installation device of claim 17, further comprising a media device type discriminator configured to identify the media device as a media device of the distinguished type.

* * * * *